(12) United States Patent
Kumata et al.

(10) Patent No.: US 6,466,242 B1
(45) Date of Patent: Oct. 15, 2002

(54) INFORMATION PROCESSING APPARATUS (75) Inventors: Akihiro Kumata, Yamatokoriyama (JP); Kiyoshi Suzuki, Yamatokoriyama (JP)

(73) Assignee: Sharp Kabuhsiki Kaisha, Osaka (JP)

( * ) Notice: Subject to any disclaimer, the term of this patent is extended or adjusted under 35 U.S.C. 154(b) by 0 days.

(21) Appl. No.: 09/293,208

(22) Filed: Apr. 16, 1999

(30) Foreign Application Priority Data

Apr. 16, 1998 (JP) .......................................... 10-105255

(51) Int. Cl.⁷ ................................................ G06F 3/00
(52) U.S. Cl. ...................... 345/963; 345/440; 345/764; 345/839; 705/8; 705/9
(58) Field of Search ................................ 345/341, 349, 345/963, 333, 329, 440, 764, 839; 702/178; 705/8, 9

(56) References Cited

U.S. PATENT DOCUMENTS 5,860,067 A * 1/1999 Onda et al. ................. 345/341
5,960,406 A * 9/1999 Rasansky et al. .............. 705/9
6,111,572 A * 8/2000 Blair et al. .................. 345/333
6,202,035 B1 * 3/2001 Lameer ....................... 702/178

FOREIGN PATENT DOCUMENTS

JP          4-65760          3/1992

* cited by examiner

*Primary Examiner*—Kristine Kincaid
*Assistant Examiner*—Mylinh T Tran
(74) *Attorney, Agent, or Firm*—Dike, Bronstein, Roberts & Cushman, IP Group Edwards & Angell, LLP; David G. Conlin; George W. Hartnell, III (57) ABSTRACT

An information processing apparatus having a schedule management function includes a display section for displaying temporal axes of at least two different cities on a schedule display screen in accordance with a time difference therebetween; a pointing section for pointing to each of the temporal axes of the different cities displayed by the display section; and an input section for inputting a time and a city of the temporal axis, which are pointed to by the pointing section, as a schedule.

4 Claims, 7 Drawing Sheets

INFORMATION PROCESSING APPARATUS

BACKGROUND OF THE INVENTION

1. Field of the Invention

The present invention relates to an information processing apparatus having a schedule management function, such as an electronic organizer, a portable terminal tool, a personal computer or the like.

2. Description of the Related Art

As of the past few years, an information processing apparatus having a schedule management function has been widely used. Among such processing apparatus, an electronic organizer, which is always brought with and used in place of a memo pad, is frequently used by those who travel around the world or who have business with clients in foreign countries. For such purposes, there is an apparatus which is capable of simultaneously storing and displaying a date and time of a city in a foreign country with a time difference, in which a client resides, as well as a standard date and time of a reference city.

For example, in an apparatus disclosed in Japanese Laid-Open Publication No. 4-65760, a schedule is converted in advance in accordance with an input standard time of a site 1 so as to conform to a standard time of a certain site 0, and stored in a storage. Thereafter, when the stored schedule is to be displayed, the stored schedule is converted so as to conform to a standard time of a desired site 2. Thus, a user of the apparatus need not to calculate a time difference between the sites during performing input and confirmation.

Figure 7:
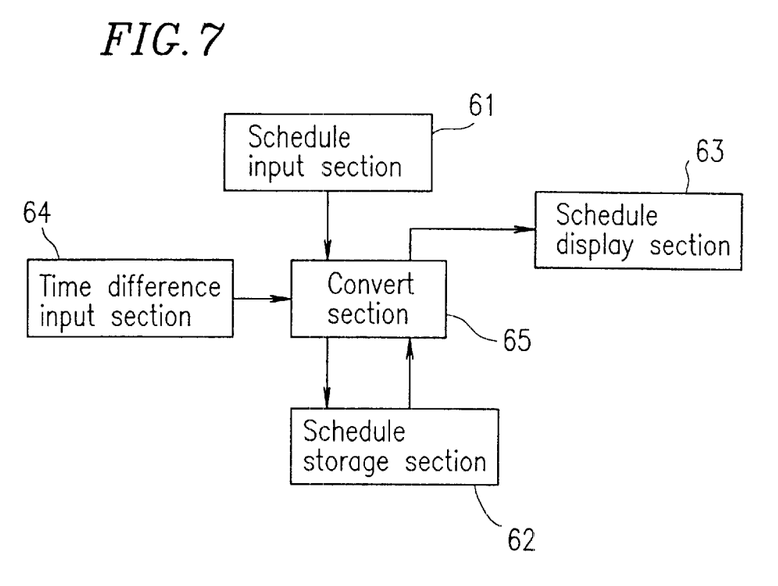
FIG. 7 is a block diagram of a conventional information processing apparatus.

Specifically, the apparatus has a configuration shown in FIG. 7. After a time difference between a certain site 0 and a site 1 which is a reference site for a schedule to be input is input from a time difference input section 64, a schedule including a date and time is input from a schedule input section 61. Then, in accordance with the date and time and the time difference of the stored schedule, the schedule is converted so as to conform to a standard time of the site 0, and then, the converted schedule is stored in a schedule storage section 62. In displaying, schedule data from the schedule storage section 62 is converted in a convert section 65 into a date and time conformable to a standard time of a desired site 2 in accordance with a time difference input from the time difference input section 64, and thereafter, the converted data is displayed in the schedule display section 63.

In a conventional apparatus performing schedule management, when a user inputs a transfer schedule between cities having a time difference therebetween, or a schedule in a city having a different standard time from a city in which the user ordinarily resides, the user needs to calculate and input a local time of a destination city having a different timetable from that of a city in which the user ordinarily resides, in accordance with a time difference.

Especially, regarding the transfer schedule with a time difference, since a departing time is based on a standard time of a city being left, whereas an arriving time is based on a standard time of a city being travelled to, a switching of the time difference is required during input. As a result, the number of steps of manipulation increases. Since it sometimes happens that an arriving date and time is earlier than a departing date and time, in such a case, the user might make mistakes both during input and displaying.

Alternatively, even when the user is in a city having a timetable other than that of a city in which the user ordinarily resides, in the case where the apparatus displays a schedule based on the timetable of the city in which the user ordinarily resides, the user might misread date and time data in the schedule.

SUMMARY OF THE INVENTION

The present invention provides an information processing apparatus having a schedule management function. The information processing apparatus of the present invention includes: a display section for displaying temporal axes of at least two different cities on a schedule display screen in accordance with a time difference therebetween; a pointing section for pointing to each of the temporal axes of the different cities displayed by the display section; and an input section for inputting a time and a city of the temporal axis, which are pointed to by the pointing section, as a schedule.

In one embodiment, the display section further displays a schedule corresponding to a temporal axis of a reference city which is one of the at least two different cities; and the display section simultaneously displays the temporal axis of the reference city, a temporal axis of a city other than the reference city and the schedule corresponding to the temporal axis of the reference city, in accordance with the time difference between the reference city and the city other than the reference city.

In another embodiment, the display section separately displays the temporal axis of the reference city and the temporal axis of the city other than the reference city.

In still another embodiment, the display section displays a temporal axis of a city to which a user of the apparatus intends to transfer in place of the temporal axis of the reference city, in accordance with the schedule of a transfer between cities having time differences therebetween.

Thus, the invention described herein makes possible the advantage of providing an information processing apparatus which allows a user to easily understand a time and a schedule content when the user transfers between cities having a time difference therebetween.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described with reference to the accompanying drawings. The present invention is not to be limited to the following descriptions of embodiments.

Figure 1:
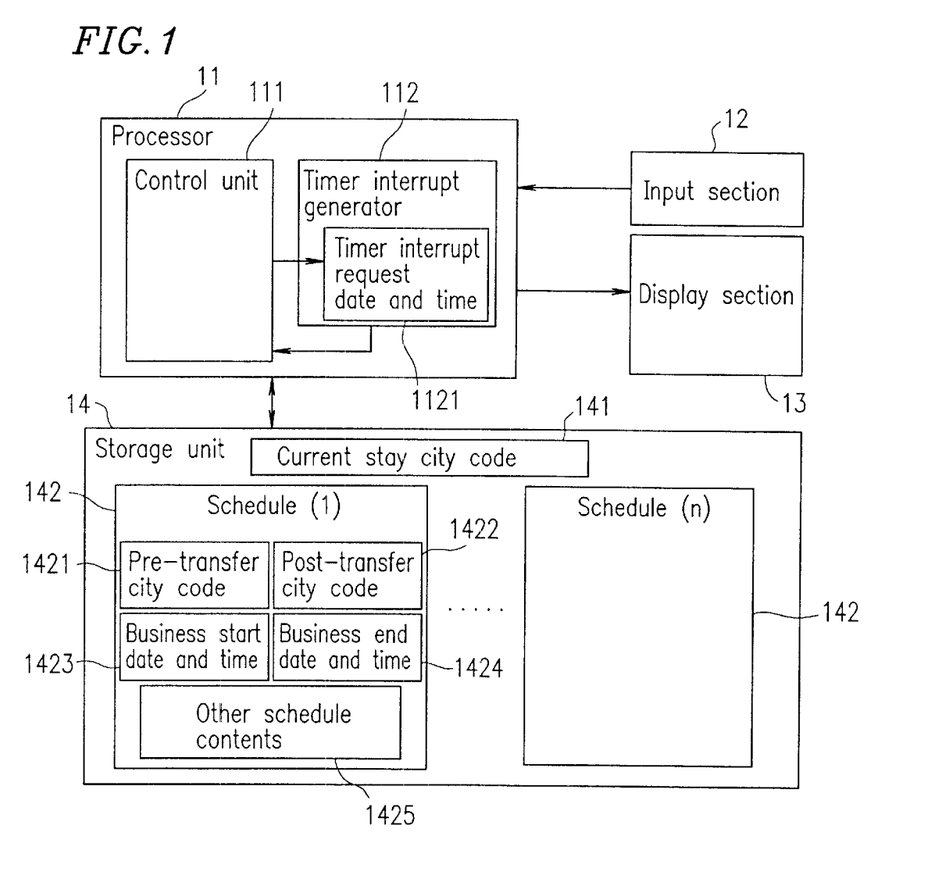
FIG. 1 is a block diagram of an apparatus of the present invention.

FIG. 1 is a block diagram of an apparatus of the present invention. The apparatus shown in FIG. 1 includes an processor 11, an input section 12, a display section 13 and a storage unit 14.

A user of the apparatus performs registration and confirmation of schedules through the input section 12, based on information obtained from the display section 13. Thereafter, the processor 11 performs a proper process based on information from the input section 12 and the storage unit 14 to display processed data in the display section 13.

The processor 11 includes a control unit 111 and a timer interrupt generator 112. The control unit 111 performs various processes for the whole apparatus.

The timer interrupt generator 112 stores a timer interrupt request date and time 1121 therein, and requests an interrupt to the control unit 111 when an internal clock reaches the timer interrupt request date and time 1121.

The internal clock of the timer interrupt generator 112 can continue to work even in a state when the whole apparatus is off. When the whole apparatus is off, the internal clock of the timer interrupt generator 112 turns the apparatus on to perform interrupt processing.

In the storage unit 14, a current stay city code 141 and schedules (1) to (n) 142 are stored. Original codes are allocated to cities all over the world respectively, such that each of time differences among these cities can be recognized.

In the current stay city code 141, a city code of a city where the user of the apparatus is currently staying is stored by the control of the control unit 111.

Each of the schedules (1) to (n) 142 is allocated to one schedule. In one schedule, a pre-transfer city code 1421, a post-transfer city code 1422, a business start date and time 1423, a business end date and time 1424, a schedule title and a schedule content 1425 are stored.

In the case where a schedule is accompanied by a transfer between cities, the business start date and time 1423 and the business end date and time 1424 are dealt with as a departing date and time and an arriving date and time, respectively.

Figures 2A, 2B:
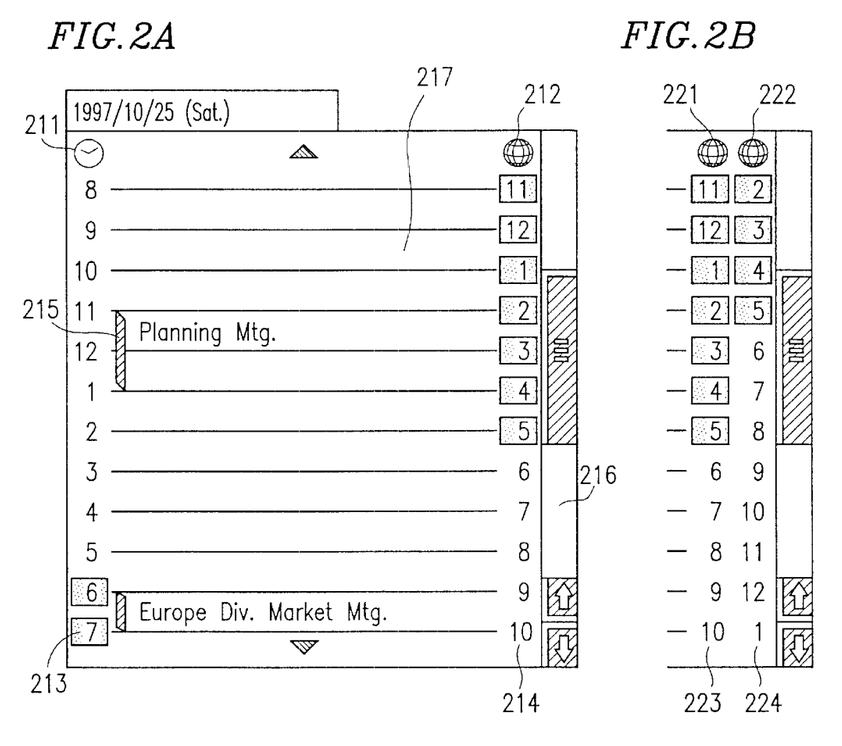
FIGS. 2A and 2B show exemplary displays according to the present invention.
Figure 3A:
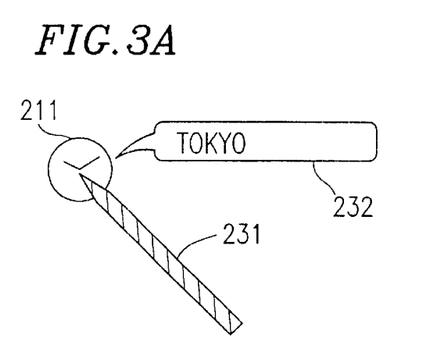
FIGS. 3A and 3B show exemplary manipulations according to the present invention.
Figure 3B:
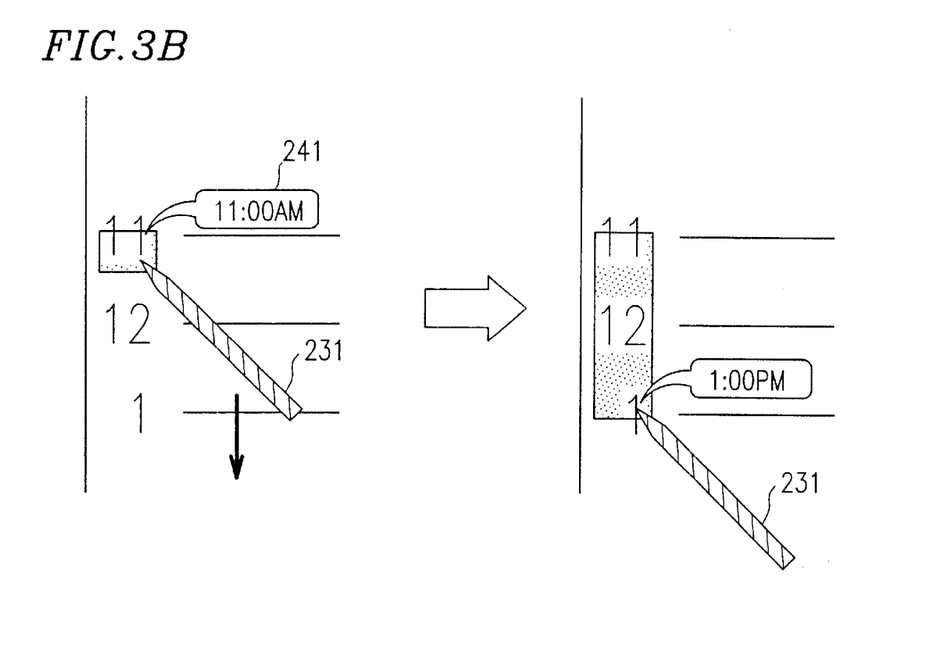

FIGS. 2A and 2B show exemplary displays of the present invention. FIGS. 3A and 3B show exemplary manipulations of the present invention.

In FIG. 2A, a previously input schedule is displayed beside a timetable 213 based on a standard time of a city in which a user of the apparatus ordinarily resides. (Hereinafter, the city in which the user of the apparatus ordinarily resides is referred to as a reference city, and the standard time of the reference city is referred to as a reference time.) An exemplary schedule display 215 means that a planning meeting is scheduled from 11 a.m. to 1 p.m. on Oct. 25, 1997. At the top of the timetable 213, a symbol 211, which represents that the timetable 213 is based on the reference time, is displayed.

While only a timetable of the reference time is shown in the conventional apparatus, according to the present invention, a timetable 214 based on a standard time of a city other than the reference city is provided so as to be parallel to the timetable 213 of the reference time. Additionally, at the top of the timetable 214, a symbol 212 which represents that the timetable 214 is based on the standard time of a city other than the reference city is displayed.

Alternatively, as shown in FIG. 2B, it is possible to display a plurality of timetables 223, 224 other than that of the reference city.

As shown in FIG. 3A, a name of each city (232) can be displayed on the timetable by pointing at each of timetable symbols (211, 212, 221 and 222) with a pen 231. By pointing the timetable symbol for a period longer than the predetermined period, the current display is replaced by another display wherein it is possible to change cities to be dealt with, or to add and/or delete timetables.

In order to facilitate the act of inputting schedules, the current display is replaced by a schedule content input display while a business start time and a business end time as well as a pre-transfer city and a post-transfer city are being input by the following acts.

Hereinafter, an operation which is performed with the pen 231 on a surface of a screen of the display section 13 will be described. As shown in FIG. 3B, after touching a start time 241 of a business on a timetable of a city where the business is scheduled with the pen 231, the user moves the pen 231 to an end time of the business while keeping the pen 231 in contact with the surface of the screen; thereafter the pen 231 is lifted away from the surface of the screen. Additionally, when a schedule of a transfer between cities having a time difference therebetween is input, the user points a region in which a departing time is displayed, on the timetable of the pre-transfer city, and then, the user moves the pen 231 to an arriving time on a timetable of the post-transfer city while keeping the pen 231 in contact with the surface of the screen, and then the pen 231 is lifted away from the surface of the screen.

While the timetable can be moved toward a right or left side by dragging a timetable symbol thereof, a timetable of a city corresponding to the city code 141 (i.e., a city where the user of the apparatus is deemed to be staying, from schedule contents) is always displayed in the left end column of the screen.

Figure 4:
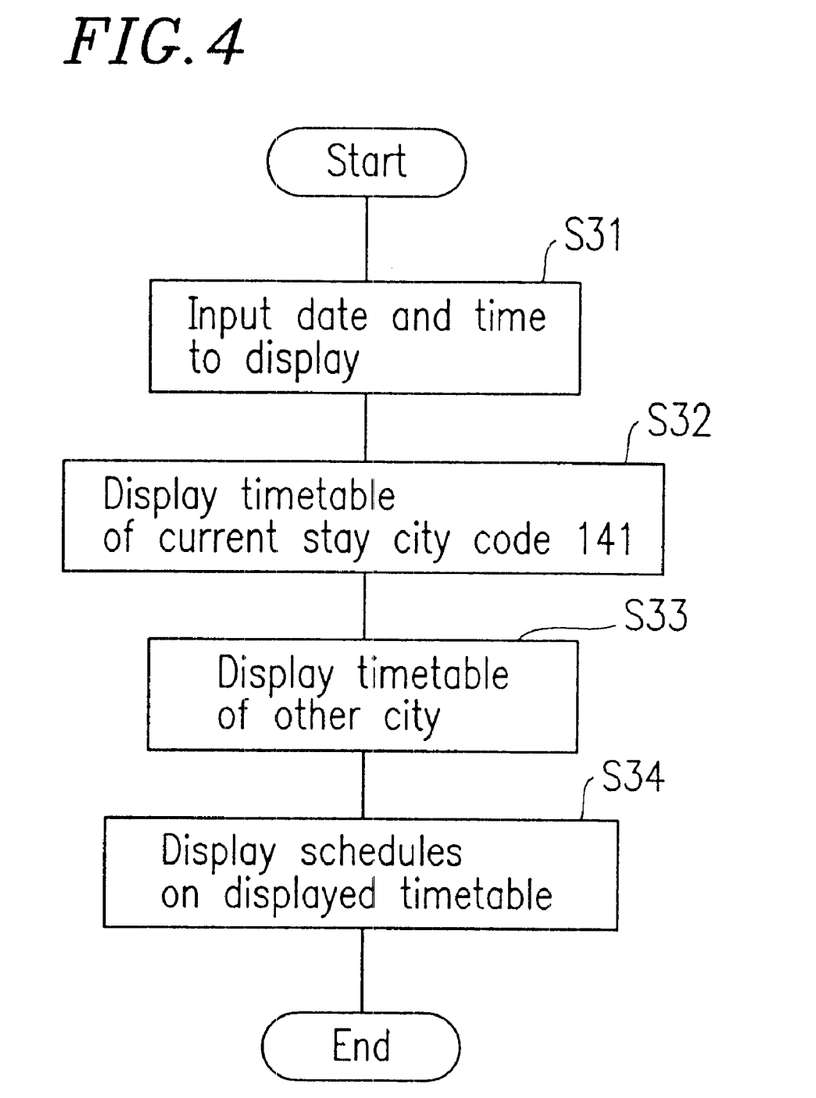
FIG. 4 is a flow chart of a display processing according to the present invention.

FIG. 4 is a flow chart of a display processing method according to the present invention.

First, the user selects or inputs a date and time to be displayed (S31). In accordance with the selected or input date and time, a timetable of a city corresponding to the current stay city code 141 is displayed at the left end column of the screen (S32). Next, in the case where a timetable of another city is entered, a time difference from the city corresponding to the current stay city code 141 is calculated, and thereafter, the timetable of the registered city is displayed so as to correspond to the timetable of the city corresponding to the current stay city code 141 (S33). A registered schedule is searched for within a displayed time zone, and if found, the found schedule is displayed on the screen (S34).

Figure 5:
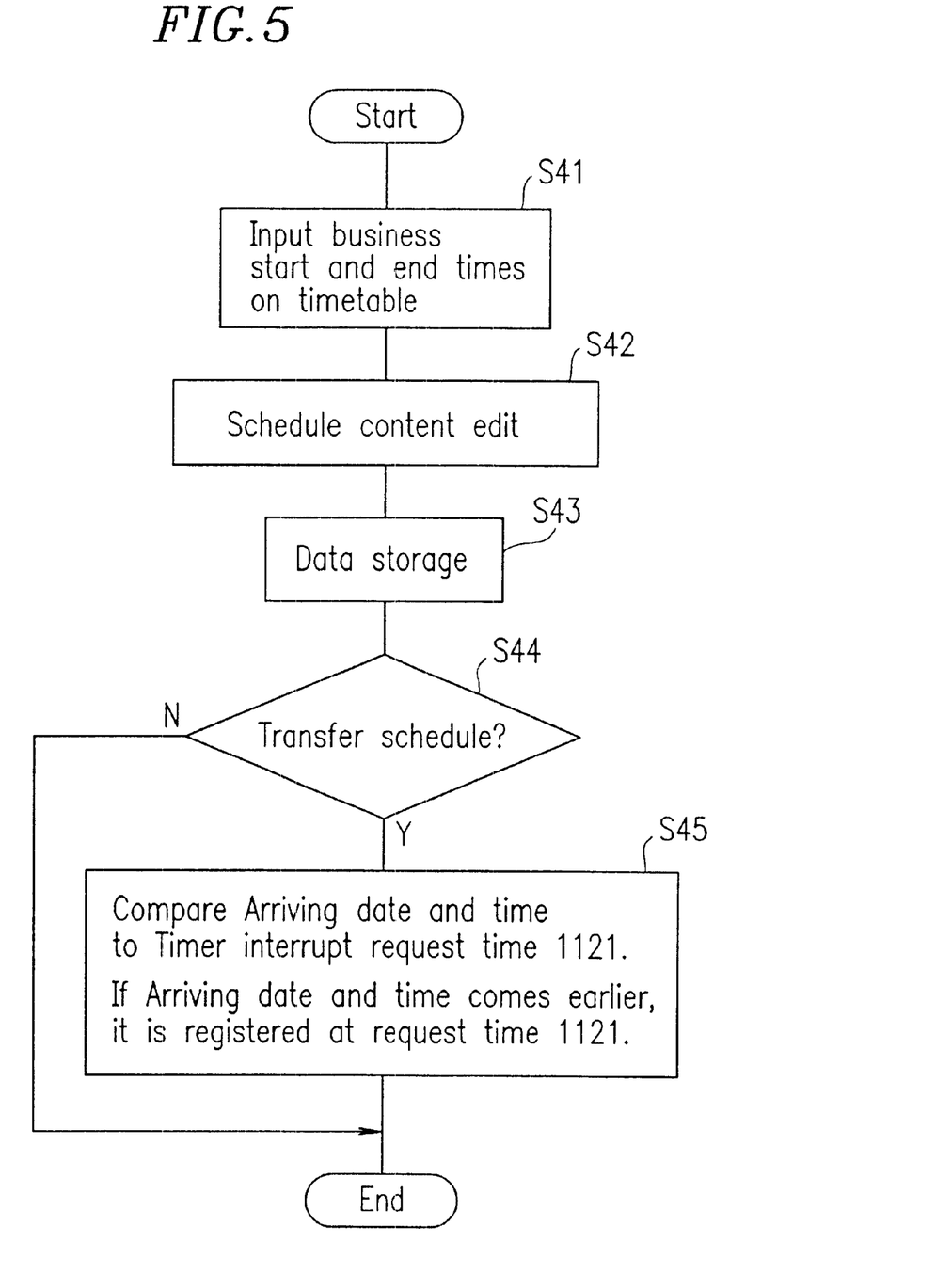
FIG. 5 is a flow chart of a schedule registration processing method according to the present invention.

FIG. 5 is a flow chart of a registration processing method according to the present invention. Hereinafter, another operation which is performed with the pen 231 on a surface of a screen of the display section 13 will be described.

The user touches, with a pen 231, a point within a region in which the start time of business or the departing time of transfer is displayed. The user, then, moves the pen 231 to a region in which the end time of business or the arriving time of transfer is displayed while keeping the pen 231 in contact with the surface of the screen; thereafter the user lifts the pen 231 away from the surface of the screen. Herein, a timetable to touch may be any of the cities displayed on the screen. In the case where an end point and a start point of the movement of the pen 231 are on different timetables, the input schedule is deemed to be a transfer schedule (S41).

Next, after the user inputs a title or a content for the schedule (S42), the data is stored in the storage unit 14 (S43). In the case where the stored data is a transfer schedule (S44), the arriving date and time of the input schedule is compared with the previously set timer interrupt request date and time 1121 of the timer interrupt generator 112. If the arriving date and time comes earlier than the interrupt request date and time 1121, the arriving date and time is set at the timer interrupt request date and time 1121 (S45). Thus, when the user transfers to a city having a different timetable, an interrupt is requested with respect to a control unit 111, so as to allow the timetable to be automatically replaced by that of the city where the user is currently staying.

Figure 6:
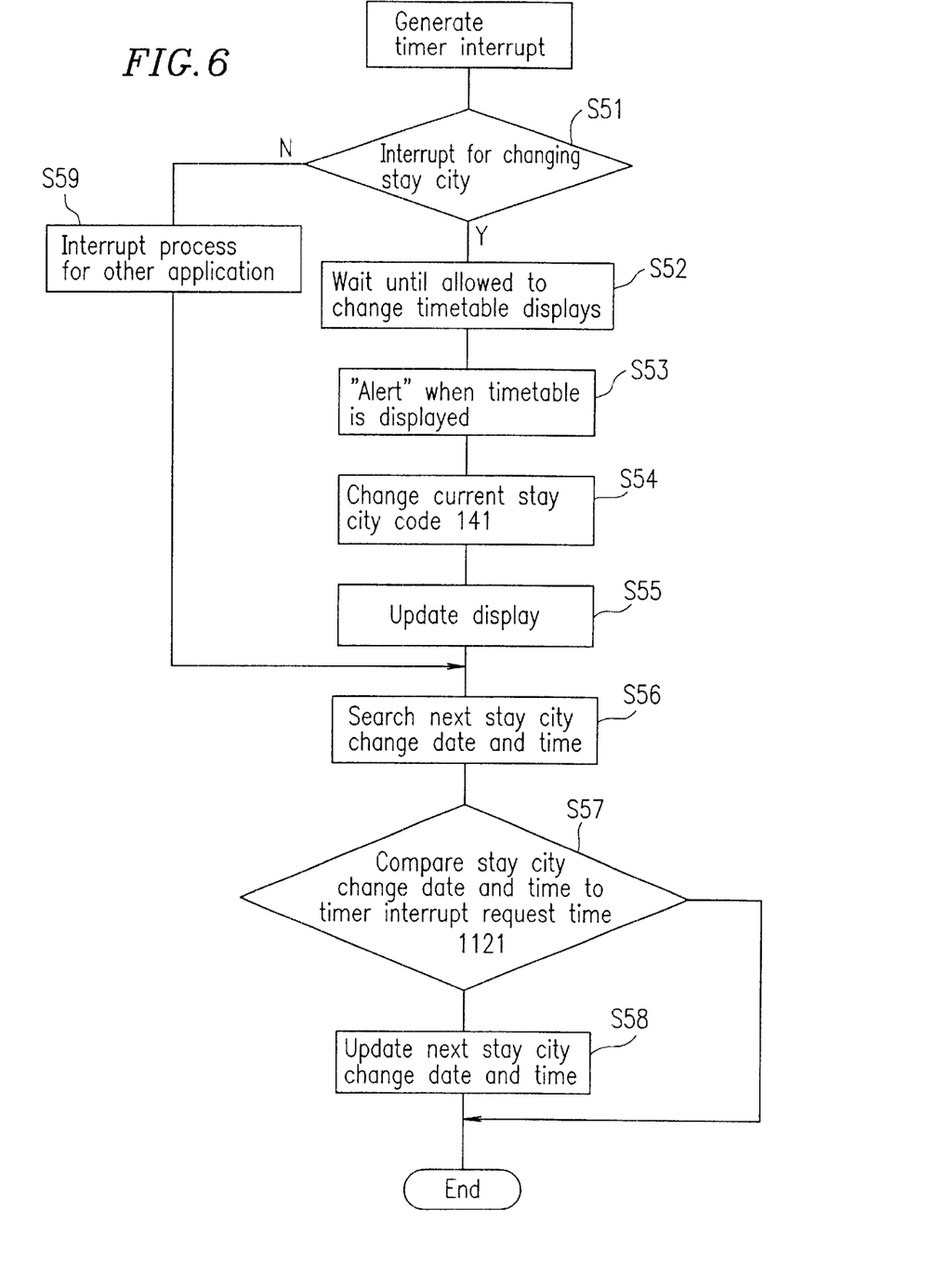
FIG. 6 is a flow chart of a timer interrupt generation processing method according to the present invention.

FIG. 6 is a flow chart of a timer interrupt generation processing method according to the present invention.

Since the timer interrupt is not only employed for the present invention but also frequently employed for other applications, it is determined whether or not the timer interrupt is for changing a stay city or cities (S51).

If the timer interrupt is not for changing the stay city or cities, the process proceeds to (S59). Thereafter, interrupt processes for other applications are performed, and then, the process proceeds to (S56).

On the other hand, if the timer interrupt is for changing a stay city or cities, it is examined whether now it is an appropriate time to change stay city(ies). When it is not appropriate, other processes for the system are performed until a permission for changing a stay city or cities is provided (S52). This arrangement is for eliminating a possibility that the user gets confused when the timetable is suddenly changed, for example, during editing of schedules.

When the permission for changing a stay city or cities is provided, the next step is performed. First, when the display is on, an alert sign is displayed on the screen, and the user is asked to confirm the sign (S53). Thereafter, the current city code 141 in the storage unit 14 is replaced by a city code of a city where the user is deemed to be staying (S54). If the timetable is now displayed, displayed data on the screen is updated (S55).

Next, a date and time to change the stay city or cities next is searched for among the registered schedules (S56). The date and time to change the stay city or cities found during the search is compared with an interrupt date and time which another application requests for (S57). If the date and time to change (the stay city or cities) comes earlier, then the date and time to change the next stay city or cities is entered at the timer interrupt request date and time 1121 of the timer interrupt generator 112 (S58). Thus, the interrupt for changing stay cities can coexist with an interrupt request such as an alarm for other applications.

According to the present invention, an information processing apparatus having a schedule management function including: a display section for displaying temporal axes of at least two different cities on a schedule display screen in accordance with a time difference therebetween; a pointing section for pointing to each of the temporal axes of the different cities displayed by the display section; and an input section for inputting a time and a city of the temporal axis, which are pointed to by the pointing section, as a schedule is provided. Therefore, it is possible to input the schedule including a transfer schedule by a simple manipulation, i.e., by pointing to the temporal axis on the schedule display screen.

Moreover, according to the present invention, the display section further displays a schedule corresponding to a temporal axis of a reference city which is one of the at least two different cities; and the display section simultaneously displays the temporal axis of the reference city, a temporal axis of a city other than the reference city and the schedule corresponding to the temporal axis of the reference city, in accordance with the time difference between the reference city and the city other than the reference city, in the information processing apparatus. Therefore, a time of a city other than the reference city can be easily found.

Moreover, according to the present invention, the display section separately displays the temporal axis of the reference city and the temporal axis of the city other than the reference city in the information processing apparatus. Therefore, the possibility of misreading a temporal axis can be eliminated.

Moreover, according to the present invention, the display section displays a temporal axis of a city to which a user of the apparatus transfers in place of the temporal axis of the reference city, in accordance with the schedule of a transfer between cities having time differences therebetween, in the information processing apparatus. Therefore, it is possible to find a time and a schedule after a user transferred without paying much attention to a time difference.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information processing apparatus having a schedule management function, comprising:

a display section for displaying temporal axes of at least two different cities on a schedule display screen in accordance with a time difference therebetween;

a pointing section for pointing to each of the temporal axes of the different cities displayed by the display section; and an input section for inputting a time and a city of the temporal axis, which are pointed to by the pointing section, as a schedule;

wherein the display section further displays a schedule corresponding to a temporal axis of a reference city which is one of the at least two different cities; and the display section simultaneously displays the temporal axis of the reference city, a temporal axis of a city other than the reference city and the schedule corresponding to the temporal axis of the reference city, in accordance with the time difference between the reference city and the city other than the reference city.

2. An information processing apparatus according to claim 1, where in the display section separately displays the temporal axis of the reference city and the temporal axis of the city other than the reference city.

3. An information processing apparatus according to claim 2, wherein the display section displays a temporal axis of a city to which a user of the apparatus intends to transfer in place of the temporal axis of the reference city, in accordance with the schedule of a transfer between cities having time differences therebetween.

4. An information processing apparatus having a schedule management function, comprising:

a display section for displaying temporal axes of at least two different cities on a schedule display screen in accordance with a time difference therebetween, the temporal axes of the at least two different cities having the same time scale;

a pointing section for pointing to each of the temporal axes of the different cities displayed by the display section; and an input section for inputting a time and a city of the temporal axis, which are pointed to by the pointing section, as a schedule;

wherein the display section further displays a schedule corresponding to a temporal axis of a reference city which is one of the at least two different cities; and the display section simultaneously displays the temporal axis of the reference city, a temporal axis of a city other than the reference city and the schedule corresponding to the temporal axis of the reference city, in accordance with the time difference between the reference city and the city other than the reference city.

* * * * *

UNITED STATES PATENT AND TRADEMARK OFFICE
CERTIFICATE OF CORRECTION

PATENT NO. : 6,466,242 B1  
DATED : October 15, 2002  
INVENTOR(S) : Kumata et al.

It is certified that error appears in the above-identified patent and that said Letters Patent is hereby corrected as shown below:

<u>Title page,</u>
Item [73], Assignee, should read as -- Sharp Kabushiki Kaisha --.

<u>Drawings,</u>
Sheet 7 of 7, the figure should be annotated to include the legend -- PRIOR ART --.

Signed and Sealed this

Seventh Day of September, 2004

JON W. DUDAS
*Director of the United States Patent and Trademark Office*